(12) United States Patent  (10) Patent No.: US 8,179,985 B2
Kao et al.  (45) Date of Patent: May 15, 2012

(54) METHOD AND APPARATUS FOR PROVIDING TIME-FREQUENCY DIVERSITY IN OFDM WIRELESS COMMUNICATION SYSTEMS

(75) Inventors: Chih-Yang Kao, Hsinchu (TW); Ming-Chien Tseng, Hsinchu (TW); Ching-Yung Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 926 days.

(21) Appl. No.: 11/878,582

(22) Filed: Jul. 25, 2007

(65) Prior Publication Data

US 2008/0181319 A1  Jul. 31, 2008

Related U.S. Application Data

(60) Provisional application No. 60/858,368, filed on Nov. 13, 2006.

(51) Int. Cl.
*H04K 1/10* (2006.01)
*H04L 27/28* (2006.01)

(52) U.S. Cl. .................................................. 375/260

(58) Field of Classification Search .................. 375/242, 375/260, 262, 267, 285, 295, 316, 340, 371; 370/203, 208, 210, 328, 338, 341, 344
See application file for complete search history.

(56) References Cited

U.S. PATENT DOCUMENTS

| | | | | |
|---|---|---|---|---|
| 2002/0150038 | A1* | 10/2002 | Sumasu et al. | 370/208 |
| 2003/0152023 | A1* | 8/2003 | Hosur et al. | 370/208 |
| 2004/0081131 | A1* | 4/2004 | Walton et al. | 370/344 |
| 2005/0265280 | A1* | 12/2005 | Roh et al. | 370/328 |
| 2005/0281240 | A1 | 12/2005 | Oh et al. | |
| 2006/0104195 | A1* | 5/2006 | Nakahara et al. | 370/203 |

OTHER PUBLICATIONS

Toshiba Corporation, NTT DoCoMo, "Further Study on Reference Signal Structure for MBMS", May 8-12, 2006.

* cited by examiner

*Primary Examiner* — David C. Payne
*Assistant Examiner* — Syed Haider
(74) *Attorney, Agent, or Firm* — Finnegan, Henderson, Farabow, Garrett & Dunner, LLP

(57) ABSTRACT

A method for transmitting signals using orthogonal frequency division multiplexing (OFDM) symbols in a wireless communication system, includes: selecting a plurality of OFDM symbols as a symbol group in time dimension; and multiplying a scrambling pattern with the symbol group.

20 Claims, 14 Drawing Sheets

METHOD AND APPARATUS FOR PROVIDING TIME-FREQUENCY DIVERSITY IN OFDM WIRELESS COMMUNICATION SYSTEMS

RELATED APPLICATIONS

This application is based upon and claims the benefit of priority from Provisional Application No. 60/858,368, filed Nov. 13, 2006, the entire contents of which are incorporated herein by reference.

FIELD OF THE INVENTION

This invention pertains in general to a method for reducing destructive interference when transmitting a signal across a wireless network and, more particularly, to a method for transmitting signals using orthogonal frequency division multiplexing (OFDM) in a wireless communication system.

BACKGROUND OF THE INVENTION

In digital communication systems and digital broadcasting systems, a signal is transmitted as an electromagnetic waveform through a physical channel, such as air, to receivers. A channel effect may occur that is non-ideal, including multipath reflection and propagation fading, that leads to signal distortion. When a receiver receives a multipath signal resulting from such multipath reflection with a large delay spread, which is equivalent to a narrow coherent bandwidth, the coherent bandwidth of the multipath signal is smaller than that of a single path signal and the channel response of the signal results in frequency selective fading. In the channel with selective fading, an OFDM based wireless communication system may overcome this kind of channel response.

OFDM techniques may be utilized in wireless communication systems and in digital video and audio broadcasting systems for high spectrum efficiency transmission. In OFDM systems, two types of network construction are multiplied frequency networks (MFN) and single frequency networks (SFN). A single frequency network is a broadcast network in which several transmitters simultaneously send the same signals over the same frequency channels. Advantages of SFNs include: (1) wide coverage of the network with a large number of transmitters and small transmission power; (2) good frequency efficiency with one frequency band for all transmitters in the network; and (3) mobile users can receive signals in the SFN and do not need to switch to another frequency band when entering an adjacent transmitting area. Systems that utilize SFNs may include, but are not limited to, Digital Video Broadcasting-Terrestrial (DVB-T), Digital Audio Broadcasting-Handheld (DVB-H), Digital Audio Broadcasting (DAB), Terrestrial Digital Multimedia Television Broadcasting (DMB-T), and Media-FLO.

In addition to decreasing the effect of multipath selective fading, channel encoding and time interleaving functions of an OFDM system can also enhance system performance and correct error bits. For better bit correcting ability, channel encoding and time interleaving functions can be used in conjunction with diversity techniques for improving channel response. Three diversity techniques are used in many systems, including time diversity, frequency diversity, and space diversity. Channel response with better diversity provides correct signal bits for channel decoding to correct the incorrect bits of the remaining channel responses. Transmitting diversity or receiving diversity is applied to OFDM wireless communication systems to provide greater channel variety and to allow good diversity gain to enhance system performance.

SFNs for OFDM wireless communication systems allow for wide signal coverage and a large number of transmitters. However, since receivers can instantaneously receive the same signals from two or more transmitters from the same SFN, the system performance when receivers are at the boundaries of coverage of two or more transmitters can be degraded. If a delay spread between the two or more signals is small, which is equivalent to wideband coherent bandwidth, and the variance of the channel response is slow, which can result in a flat fading channel, the receivers may receive a signal resulting from destructive interference that is caused by the two or more signals having different phase rotations and arriving at the same time. If a long coherent time of the signal caused by a shadowing effect arises with a low flat channel response, the system performance can degrade over a long period of time. Such system degradation may occur even though the OFDM system decreases the effect of selective channel fading and there are channel encoding and time interleaving techniques preventing consecutive errors and correcting error bits of the remaining channel responses.

For example, FIGS. 1A and 1B illustrate a conventional OFDM wireless communication system 100 with flat fading channel response caused by a receiver 110 receiving two signals at coverage boundaries of a transmitter 102 of area-A and a transmitter 108 of area-B, both of which transmit the same signals 112 and 118 containing pilot signals p and data signals d(0), d(1), . . . , d(k), respectively. With reference also to FIG. 1B, the signal 112 of OFDM symbols from the transmitter 102 of area-A passes through channel A with channel response $h_a$ 104. The signal 118 of OFDM symbols from the transmitter 108 of area-B passes through channel B with channel response $h_b$ 106. If a received signal 120 from the transmitters 102 and 108 is $s_{01}$ then:

$$s_{01} = s_{00} * (h_a + h_b),$$

where $s_{00}$ is the signal 112 from the transmitter 102 or the signal 118 from the transmitter 108. A multipath delay between the two signals 112 and 118 from area-A and area-B, respectively, may be small and a destructive interference may be generated because of different phase rotations in the channel responses. When the channel response $h_a$ is similar to $-h_b$, the combined effect of the channel responses, i.e., $h_a + h_b$, may be a flat and wideband fading channel response on the receiver side. In addition, because a low received signal magnitude 122 caused by the destructive interference may be smaller than a threshold value 124 of the signal detector in the receiver 110, detection of the received signal 120 may fail and the channel decoder of the receiver 110 may also fail to correct error bits.

Diversity techniques can help prevent the low and flat channel responses. FIG. 2 shows a method for enabling a mobile station 250 to obtain a sector diversity gain by applying space-time coding (STC) to the signals transmitted in each sector in order to improve reception performance of the mobile station 250 in a cell/sector boundary in accordance with U.S. Pub. No. 2005/0265280. Each OFDM transmitter of base stations $210_1$-$210_M$ includes an STC encoder 211, a selection controller 230, and a selector 213, and can produce a diversity gain at cell/section boundaries. The selection controller 230 controls the selector 213 to form properly encoded symbols after the STC encoder 211. In each sector, space-time code streams to be transmitted in the sector are selectively output according to a corresponding one of the control signals, forming a specific per-cell pattern, and the pattern is changed for each update interval of the space-time code stream, in order to provide uniform sector diversity to the mobile station 250.

FIG. 3 shows a method for transmitting a broadcasting channel by means of cyclic delay diversity in an OFDM mobile communication system in accordance with U.S. Pub. No. 2005/0281240. In this method, each transmitter is controlled by a cyclic delay controller 370 to make different cyclic delays with the same transmitted data and hence a mobile station receives signals with diversity gain.

FIG. 4 illustrates a group scrambling method to provide channel diversity of multi-cell Multimedia Broadcast Multicast Service (MBMS) transmission in accordance with "R1-061264: Further study on reference signal structure for MBMS," 3GPP LTE RAN1 meeting document by Toshiba Corp., NTT DoCoMo. According to this method, subcarriers on which MBMS data are transmitted can be divided into several subcarrier groups, e.g., groups 411-413 for a first transmitter and groups 421-423 for a second transmitter. All data and pilot signals of each subcarrier group are multiplied by a normalized random complex number from a scrambling pattern 414 or 424. At coverage boundaries of the two transmitters, a receiver receives a signal 430 from the two transmitters with scrambling of the random complex numbers in each subcarrier group. Scrambling of the complex random number in each subcarrier group is intended to prevent destructive signal interference. Channel response 431 for each subcarrier group is of low correlation and hence a frequency diversity effect is obtained. However, this group scrambling method may be unattractive for channel estimation in frequency domain because of non-continuity in channel response, which may result in decrease of channel estimation accuracy and increase of channel estimation complexity on the receiver side. In addition, the slow fading channel of a subcarrier group by a shadowing effect may keep an almost unchanged low channel response for all time in such diversity scenarios. That part of the signal may not be correctly detected.

SUMMARY OF THE INVENTION

In accordance with the invention, there is provided a method for transmitting signals using orthogonal frequency division multiplexing (OFDM) symbols in a wireless communication system, the method comprising: selecting a plurality of OFDM symbols as a symbol group in time dimension; and multiplying a scrambling pattern with the symbol group.

Also in accordance with the invention, there is provided an apparatus for transmitting signals using OFDM symbols in a wireless communication system, the apparatus comprising: an OFDM symbol group selector for selecting a plurality of OFDM symbols as a symbol group in time dimension; and a scrambler for multiplying a scrambling pattern with the symbol group.

Further in accordance with the invention, there is provided a method for transmitting signals using OFDM symbols in a wireless communication system, the method comprising: selecting a plurality of subcarriers in frequency dimension and a plurality of OFDM symbols in time dimension as a grid group; and multiplying a scrambling pattern with the grid group.

Additionally in accordance with the invention, there is provided an apparatus for transmitting signals OFDM symbols in a wireless communication system, the apparatus comprising: an OFDM symbol and subcarrier group selector for selecting a plurality of subcarriers in frequency dimension and a plurality of OFDM symbols in time dimension as a grid group; and a scrambler for multiplying a scrambling pattern with the grid group.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent similar elements unless otherwise represented. The implementations set forth in the following description of exemplary embodiments consistent with the present invention do not represent all implementations consistent with the claimed invention. Instead, they are merely examples of systems and methods consistent with aspects related to the invention as recited in the appended claims.

Embodiments consistent with the present invention utilize time-dimension group scrambling or grid group scrambling techniques to form a diversity of channel response with narrow coherent bandwidth and short coherent time. Such benefits are provided in addition to channel coding and time interleaving functions of orthogonal frequency division multiplexing (OFDM) wireless communication systems to correct error signal bits. Each of the time-dimension group scrambling and grid group scrambling techniques may improve the channel response and prevent a destructive interference from short delay spread of two or more transmitted signals at coverage boundaries of transmitters in single frequency networks (SFN).

Also in embodiments consistent with the present invention, OFDM symbols and subcarriers of two or more adjacent transmitters may be selected and grouped in an SFN of OFDM communication systems after OFDM multiplexing. The grouped symbols and subcarriers may then be scrambled by multiplying the groups by a scrambling pattern, which may consist of random complex numbers. A combined signal from the two or more transmitters may result in narrower coherent bandwidth and shorter coherent time than a signal received from the one of the two or more transmitters, which are equivalent to small delay spread and time variant channel response. A transmit diversity may be increased through this process.

Figure 1A:
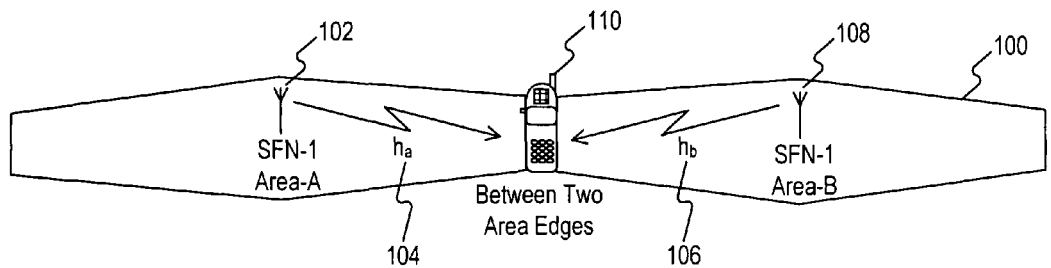
FIGS. 1A and 1B illustrate a conventional OFDM wireless communication system.
Figure 1B:
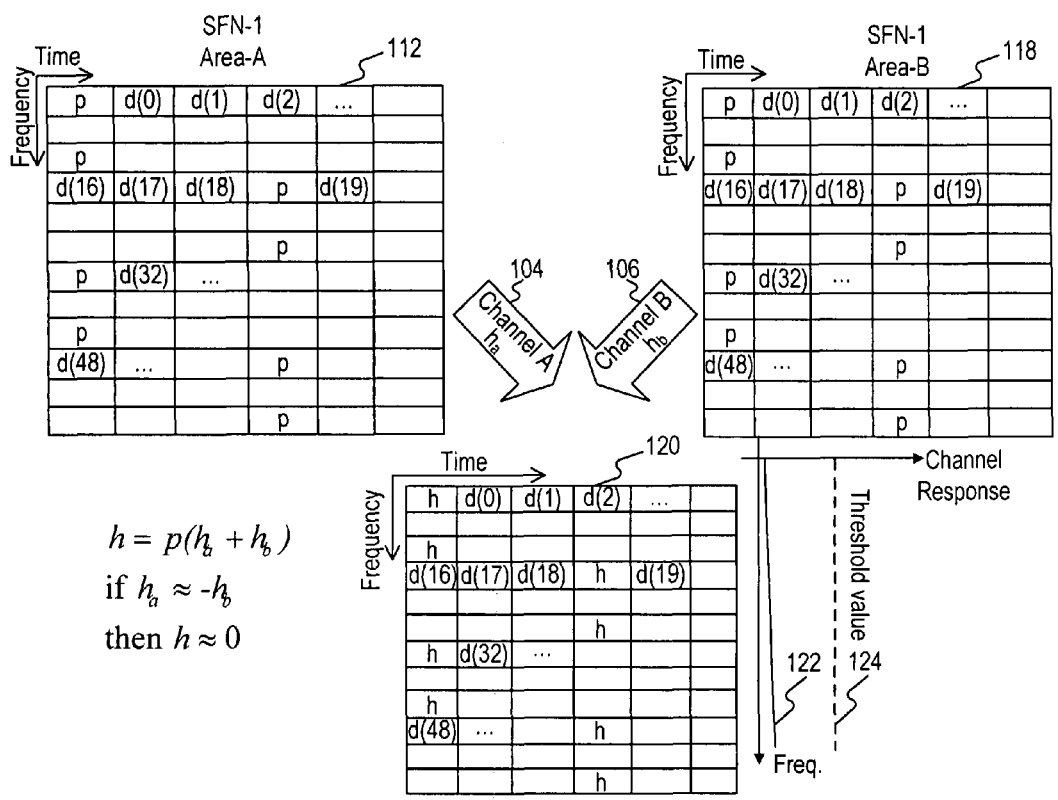
Figure 2:
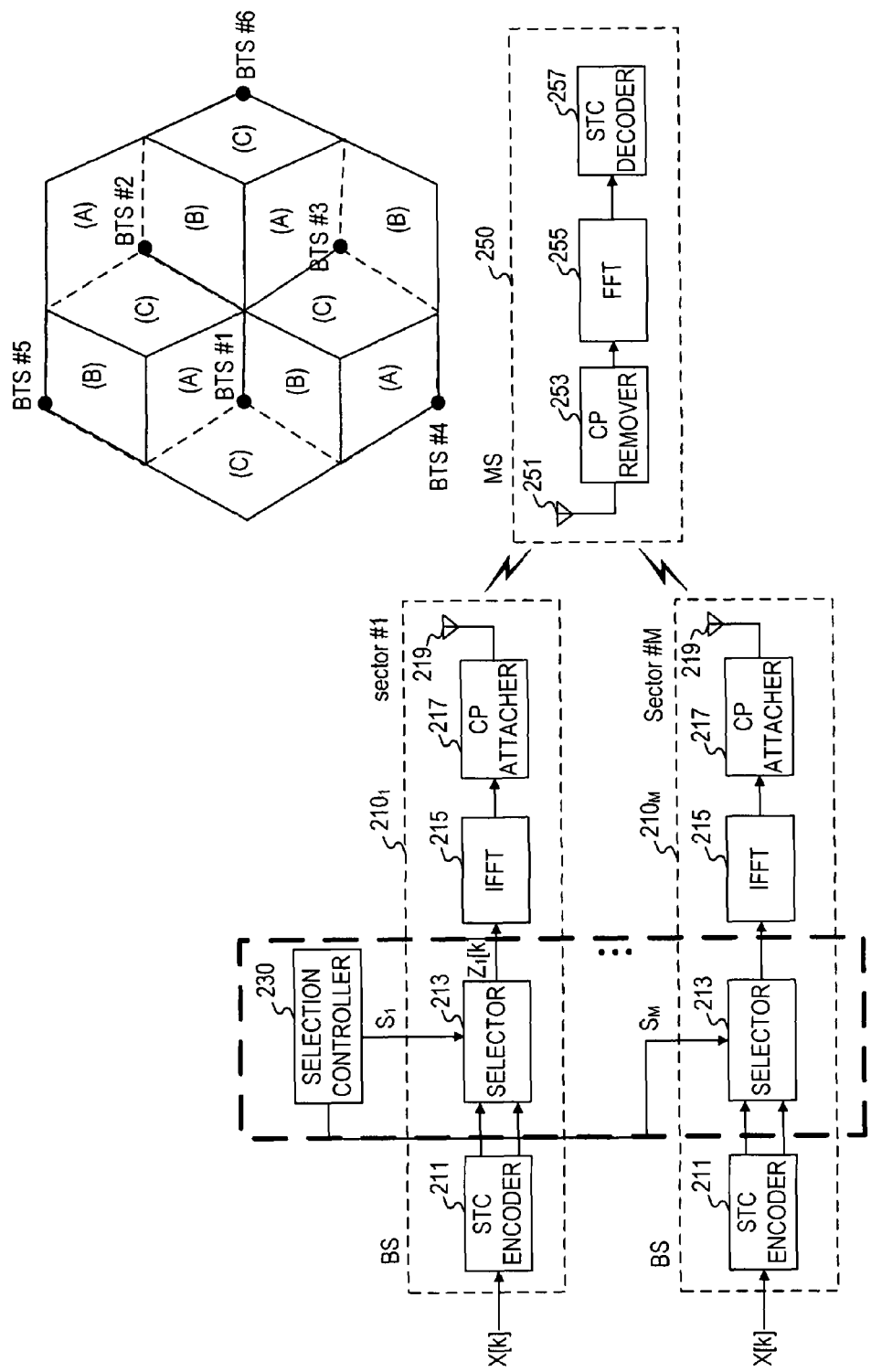
FIG. 2 illustrates a method for transmitting OFDM signals and for providing sector diversity in a mobile communication system according to the prior art.
Figure 3:
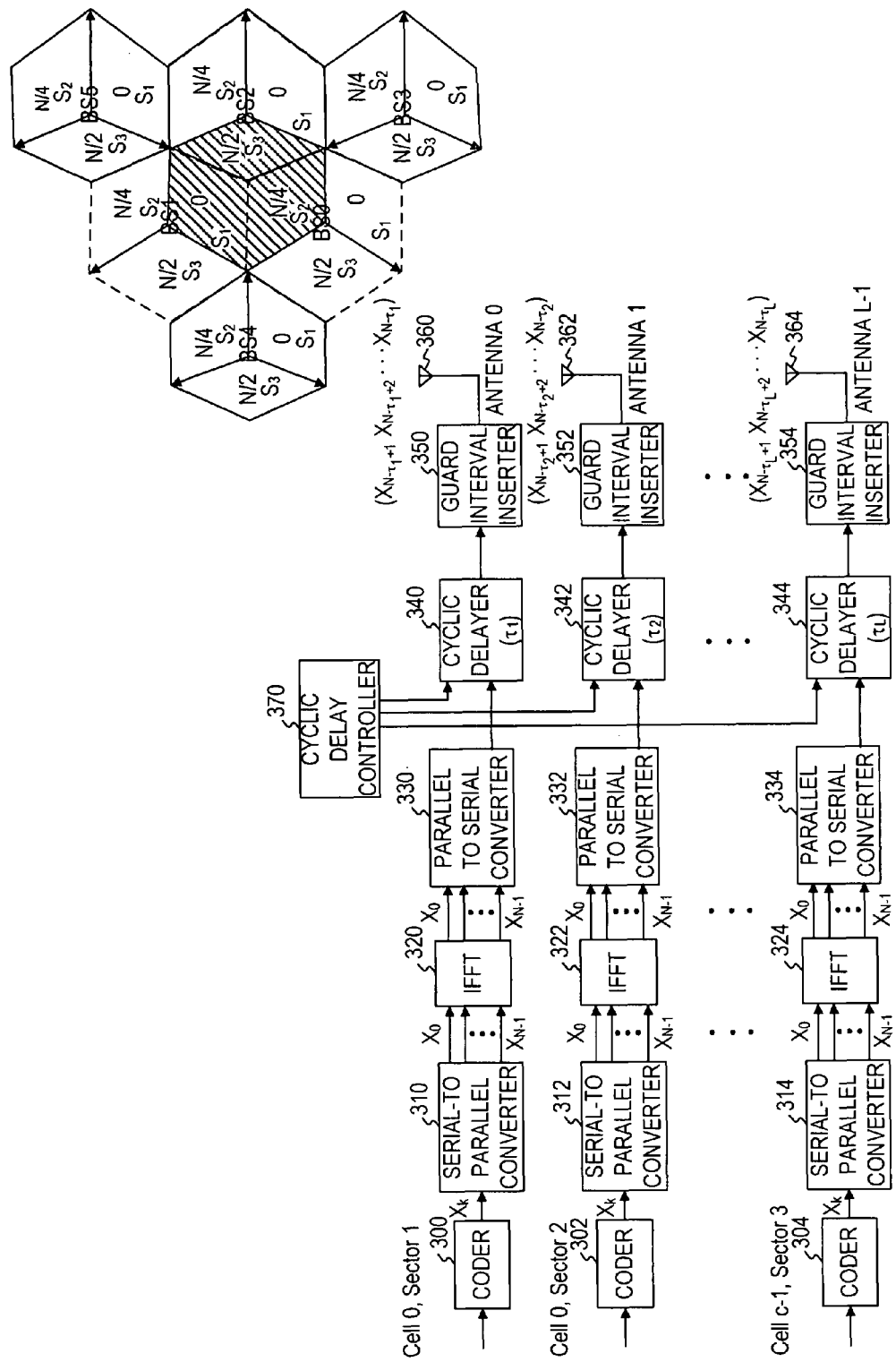
FIG. 3 illustrates a method for transmitting a broadcasting channel by means of cyclic delay diversity according to the prior art.
Figure 4:
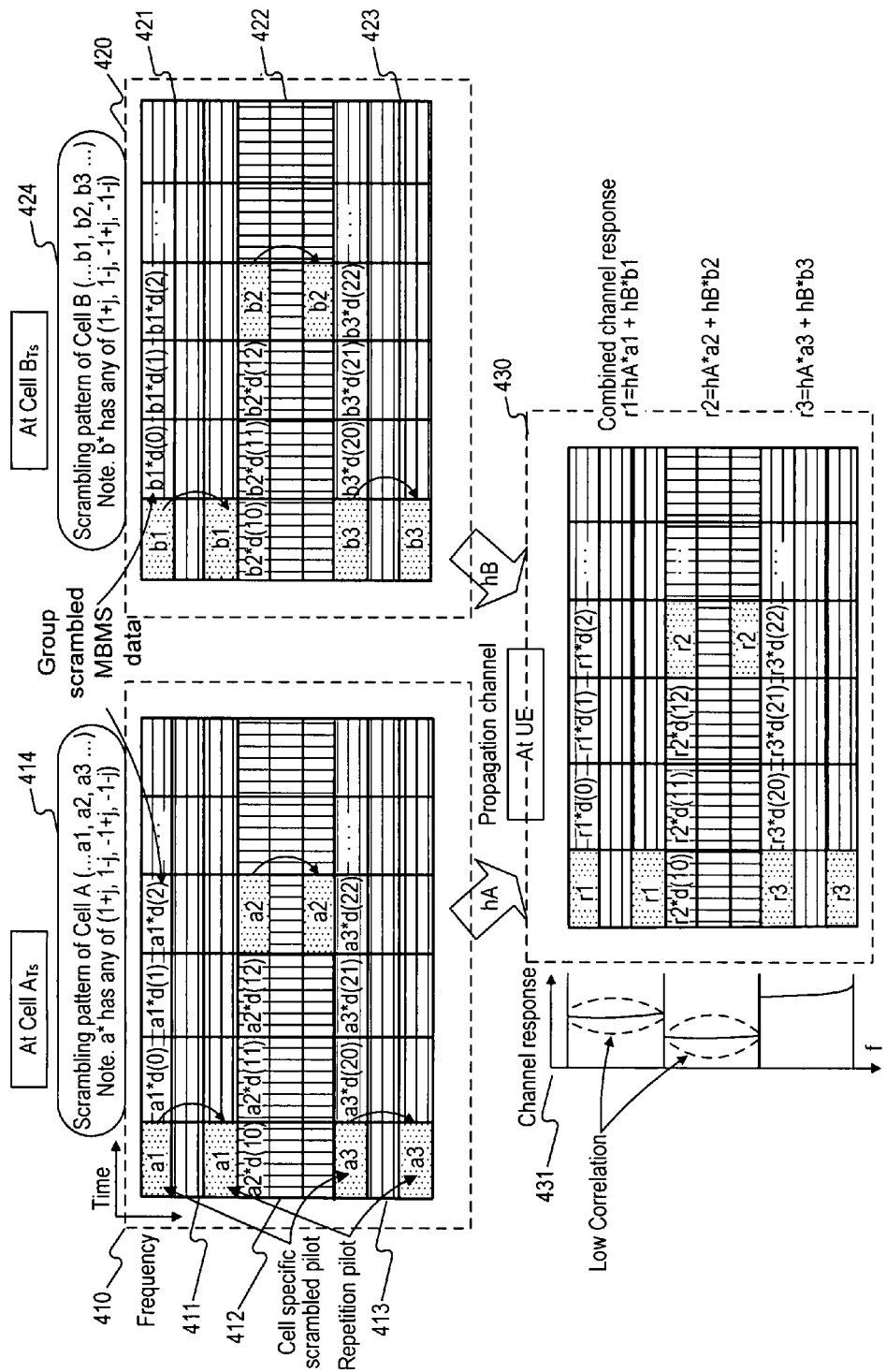
FIG. 4 illustrates a group scrambling method to provide channel diversity of multi-cell MBMS transmission according to the prior art.
Figure 5A:
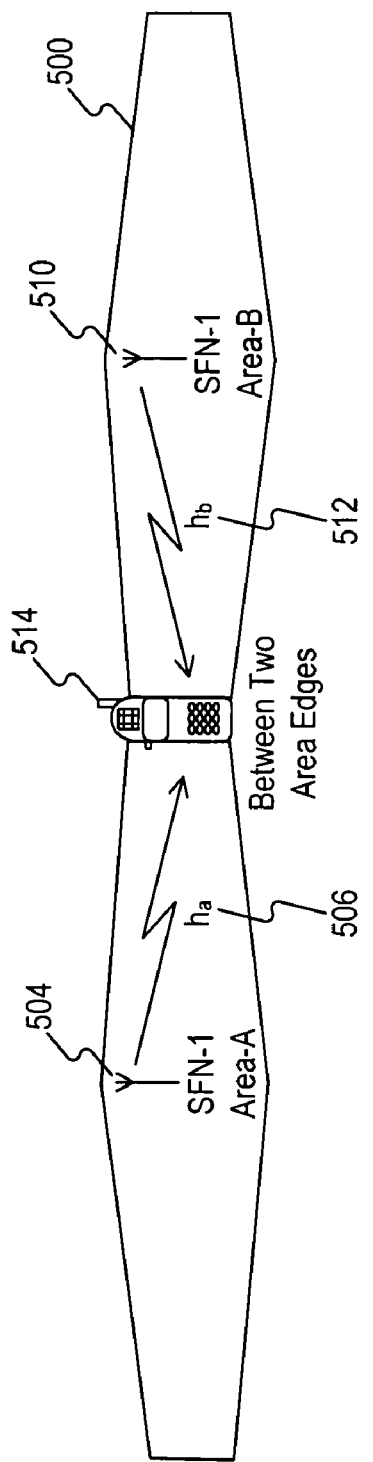
FIGS. 5A and 5B illustrate a time-dimension group scrambling method applied to an OFDM wireless communication system in an SFN according to an exemplary embodiment.
Figure 5B:
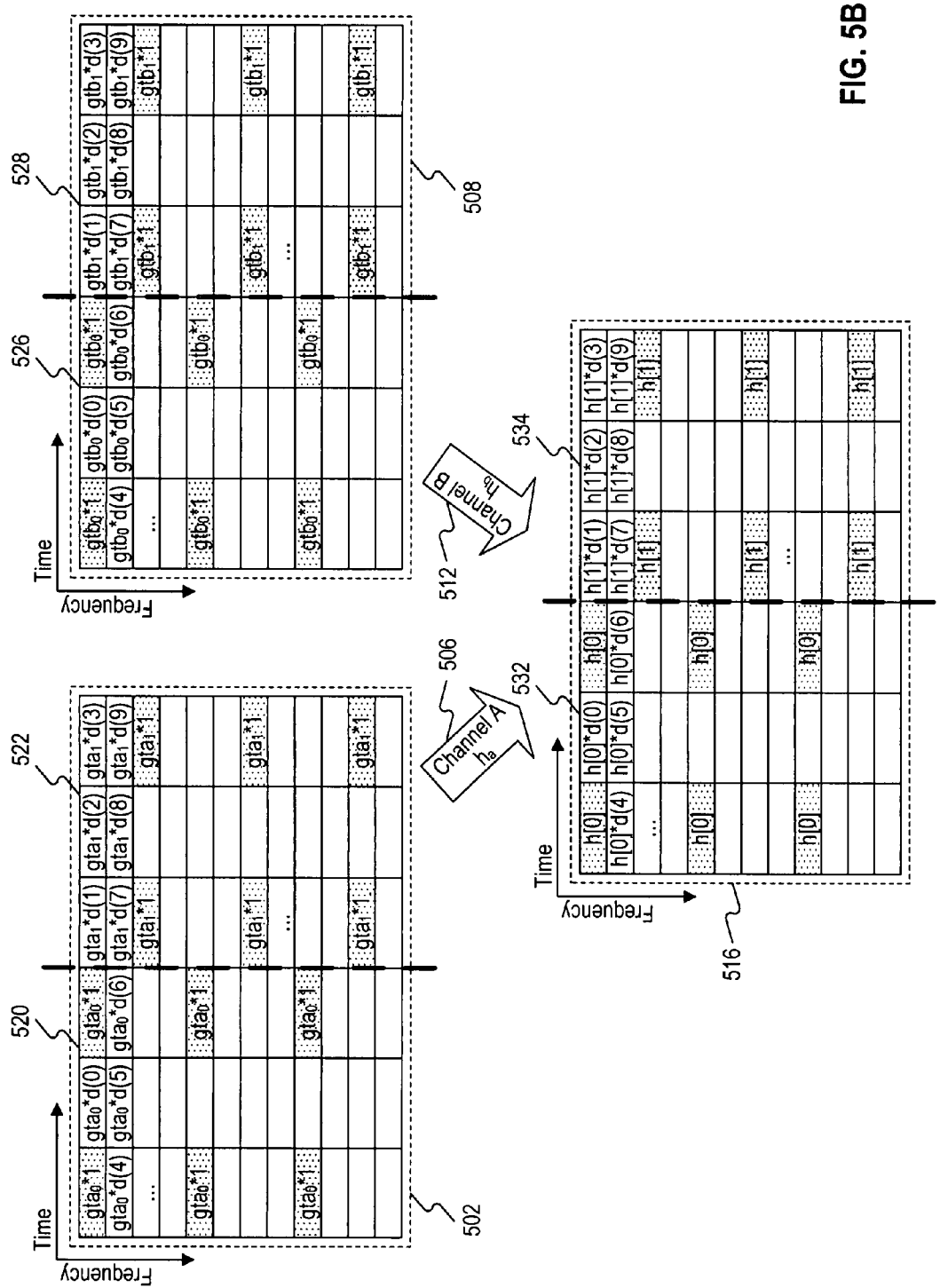

FIGS. 5A and 5B illustrate a time-dimension group scrambling method applied to an OFDM wireless communication system 500 in an SFN according to an exemplary embodiment. A signal $s_{11}$ 502 of OFDM symbols from a transmitter 504 of area-A passes through channel A with channel response $h_a$ 506. A signal $s_{12}$ 508 of OFDM symbols from a transmitter 510 of area-B passes through channel B with channel response $h_b$ 512. A receiver 514 receives a signal $s_{13}$ 516 at coverage boundaries of the transmitters 504 and 510, where $$s_{13}=s_{11}*h_a+s_{12}*h_b.$$

With reference to FIG. 5B, the OFDM signals 502 and 508 may contain pilot signals "1" (located in shaded blocks) or data signals d(0), d(1), . . . , d(k). Before transmission, the transmitter 504 of area-A groups several OFDM symbols, together, e.g., group1 520 and group2 522, and multiplies the symbols in each of group1 520 and group2 522 by a normalized random complex number (e.g., $gta_0$ and $gta_1$) from a scrambling pattern with an amplitude value of 1, to yield corresponding scrambled groups. Similarly, the transmitter 510 of area-B groups several OFDM symbols together, e.g., group1 526 and group2 528, and multiplies the symbols in each of group1 526 and group2 528 by a normalized random complex number (e.g., $gtb_0$ and $gtb_1$) from a scrambling pattern, with an amplitude value of 1, to yield corresponding scrambled groups. The scrambling patterns in the transmitters 504 and 510 could be different and there may not be any specific rule to choose the value of the normalized random complex number. The symbols in each scrambled group may then be forwarded to an inverse fast Fourier transformer (IFFT) (not shown in FIGS. 5A and 5B) in each of the transmitters 504 and 510.

In one embodiment, the scrambling pattern in the transmitter 504 of area-A is $[gta_0, gta_1, \ldots gta_{M-1}]$, and the scrambling pattern in the transmitter 510 of area-B is $[gtb_0, gtb_1, \ldots gtb_{M-1}]$, where M is the total number of symbol groups in each of the transmitters 504 and 510. The scrambling patterns in the transmitters 504 and 510 are random complex numbers with an amplitude value of 1. OFDM symbols in the same group are scrambled by the same scrambling number. The channel responses of the signals received from the transmitters 504 and 510 in the SFN are:

$$h[0]=h_a*gta_0+h_b*gtb_0,$$

$$h[1]=h_a*gta_1+h_b*gtb_1,$$

$$h[2]=h_a*gta_2+h_b*gtb_2,$$

.

.

.

$$h[M-1]=h_a*gta_{M-1}+h_b*gtb_{M-1}.$$

For example, if the total number of symbol groups M in each of the transmitters 504 and 510 is 2, the scrambling pattern in the transmitter 504 of area-A may then be $[gta_0, gta_1]$, and the scrambling pattern in the transmitter 510 of area-B may be $[gtb_0, gtb_1]$. The channel response of the signals received from the transmitters 504 and 510 in the SFN may be:

$$h[0]=h_a*gta_0+h_b*gtb_0,$$

$$h[1]=h_a*gta_1+h_b*gtb_1.$$

Figure 5C:
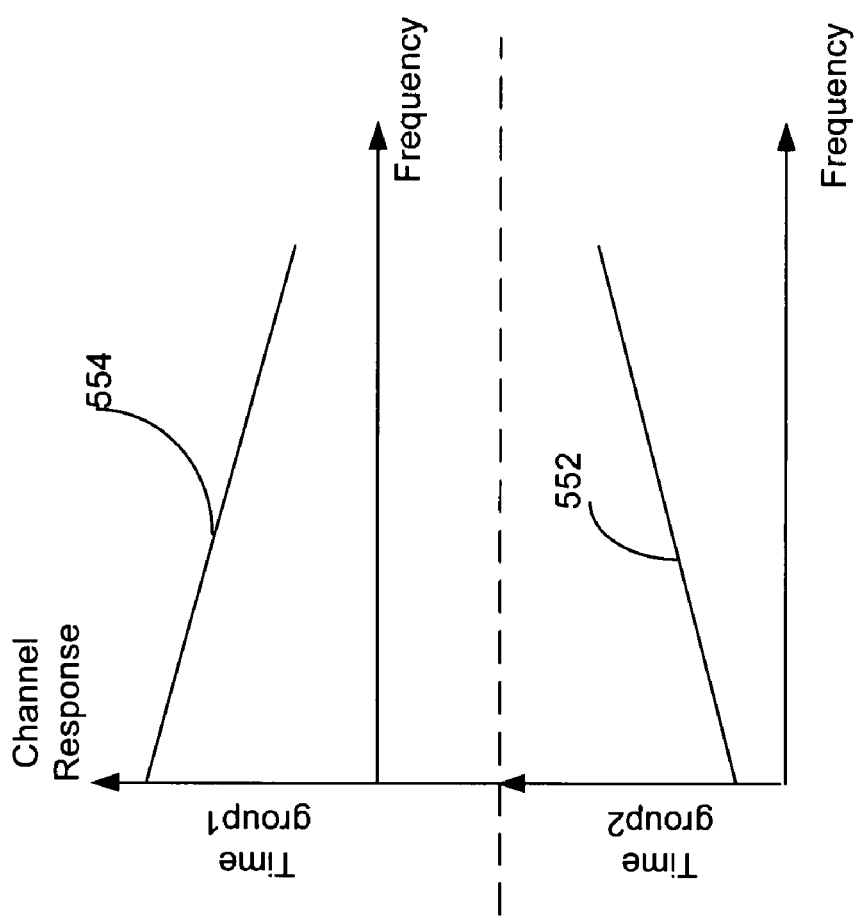
FIG. 5C illustrates channel response for each symbol group in a received signal according to an exemplary embodiment.

As shown in FIG. 5C, channel response 552 and 554 for group1 532 and group2 534 in the received signal 516, respectively, is of low correlation and hence a time diversity effect is obtained.

Figure 6:
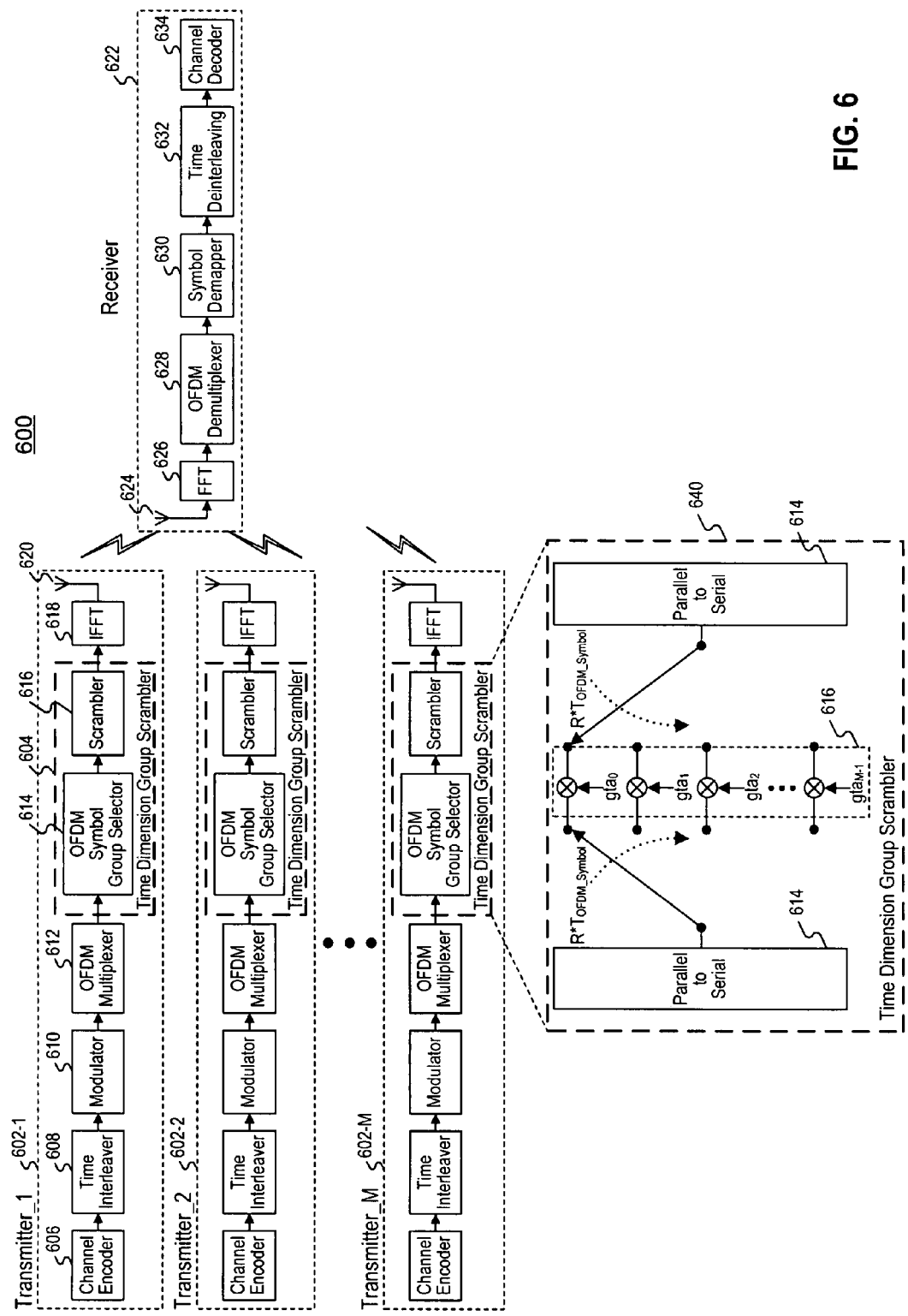
FIG. 6 illustrates an OFDM wireless communication system to which a time-dimension group scrambling method is applied according to an exemplary embodiment.

FIG. 6 is a block diagram illustrating an OFDM wireless communication system 600 to which a time-dimension group scrambling method is applied according to an exemplary embodiment. The same data are transmitted from M different transmitters 602-1, 602-2, . . . , 602-M in an SFN. In each transmitter 602-1, 602-2, . . . , 602-M, a signal of OFDM symbols is transmitted to a time-dimension group scrambler 604 through a channel encoder 606, a time interleaver 608, a modulator 610, and an OFDM multiplexer 612. The channel encoder 606 and the time interleaver 608 provide means for not only preventing consecutive errors but also correcting error bits according to correctly decoded data bits on the receiver side. The time-dimension group scrambler 604 includes an OFDM symbol group selector 614 for grouping symbols and a scrambler 616 for scrambling the symbols by multiplying each group with a normalized random complex number. An IFFT 618 converts the scrambled signal from frequency-domain to time-domain and the time-domain signal is then transmitted by an antenna 620. On the receiver side, a receiver 622 includes an antenna 624 that receives the time-domain signal followed by a fast Fourier transformer (FFT) 626 which converts the time-domain signal to a frequency-domain signal. The frequency-domain signal then passes through an OFDM demultiplexer 628, a symbol demapper 630, a time deinterleaver 632, and a channel decoder 634 to recover the transmitted data.

In one embodiment, as shown in block 640, the time-dimension group scrambler 604 can be implemented with the OFDM symbol group selector 614 configured to switch to different normalized random complex numbers in the scrambling pattern $[gta_0, gta_1, \ldots gta_{M-1}]$ for scrambling different OFDM symbol groups in the scrambler 616. The OFDM symbol group selector 614 switches to an OFDM symbol group in an $R*T_{OFDM\_Symbol}$ interval, where $T_{OFDM\_Symbol}$ is the OFDM symbol time interval and R is the number of symbols in a group. $T_{OFDM\_Symbol}$ is equal to $C*T_{sample}$, where C is the number of subcarriers and $T_{sample}$ is the sampling time.

Figure 7A:
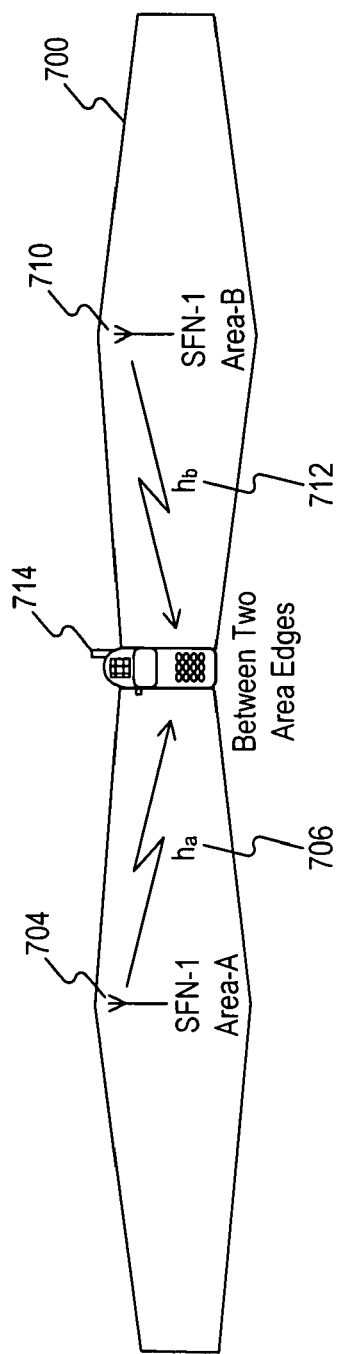
FIGS. 7A and 7B illustrate a grid group scrambling method applied to an OFDM wireless communication system in an SFN according to an exemplary embodiment.
Figure 7B:
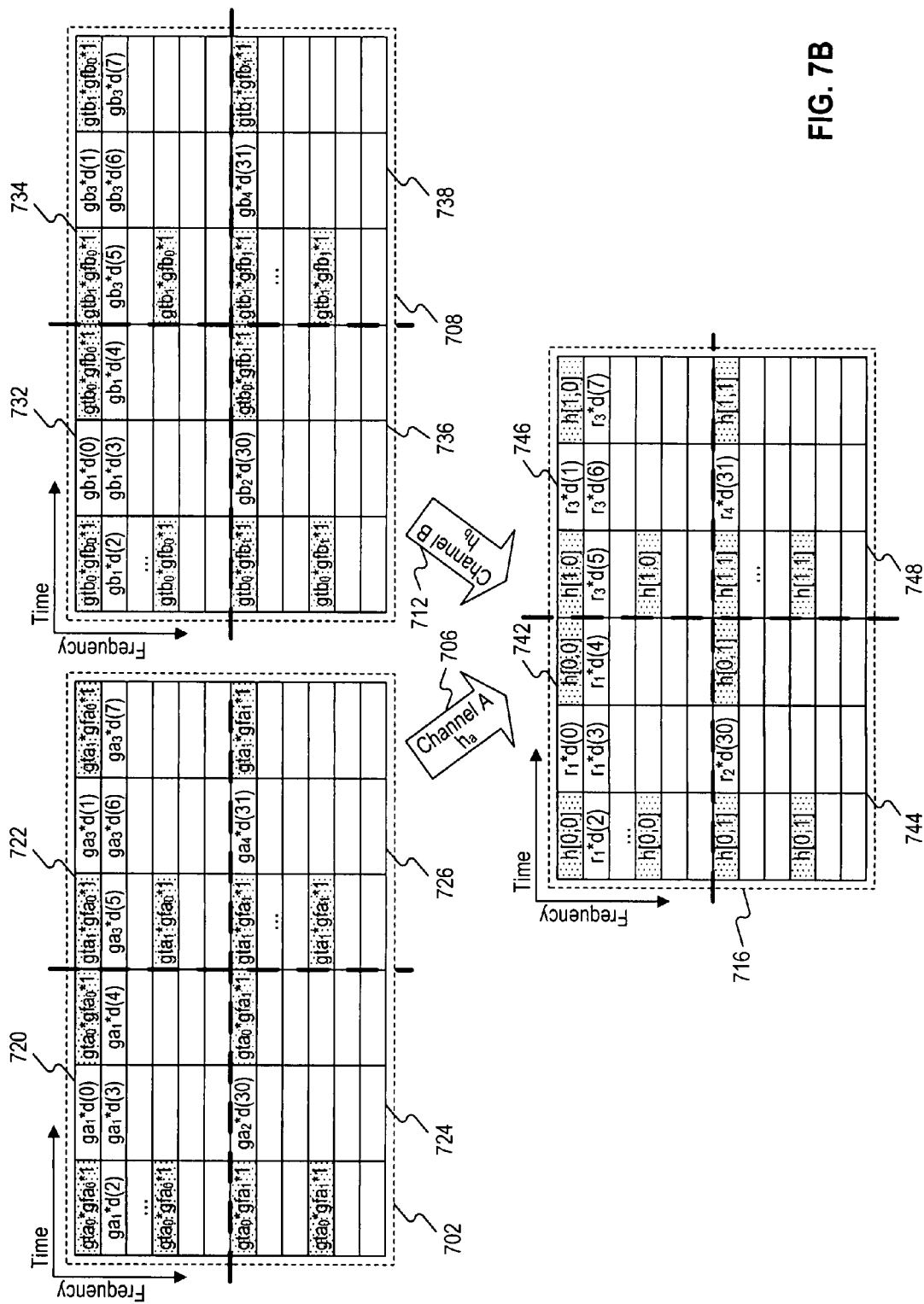

FIGS. 7A and 7B illustrate a grid group scrambling method applied to an OFDM wireless communication system 700 in an SFN according to an exemplary embodiment. A signal $s_{21}$ 702 of OFDM symbols from a transmitter 704 of area-A passes through channel A with channel response $h_a$ 706, and a signal $s_{22}$ 708 of OFDM symbols from a transmitter 710 of area-B passes through channel B with channel response $h_b$ 712. A receiver 714 receives a signal $s_{23}$ 716 at coverage boundaries of the transmitters 704 and 710, where $$s_{23}=s_{21}*h_a+s_{22}*h_b.$$

With reference to FIG. 7B, the OFDM signals 702 and 708 may contain pilot signals "1" (located in shaded blocks) or data signals d(0), d(1), . . . d(k). Before transmission, the transmitter 704 of area-A groups several OFDM symbols and several subcarriers together, e.g., group1 720, group2 722, group 3 724, and group4 726, in a grid form, and multiplies the symbols in each of group1 720, group2 722, group 3 724, and group4 726 by a normalized random complex number (e.g., $gta_0$ and $gta_1$) from a symbol scrambling pattern and further multiplies by a random complex number (e.g., $gfa_0$ and $gfa_1$) from a subcarrier scrambling pattern, to yield corresponding scrambled groups. Similarly, the transmitter 710 of area-B groups several OFDM symbols and several subcarriers together, e.g., group1 732, group2 734, group 3 736, and group4 738, in a grid form, and multiplies the symbols in each of group1 732, group2 734, group 3 736, and group4 738 by a random complex number (e.g., $gtb_0$ and $gtb_1$) from a symbol scrambling pattern and further multiplies by a random complex number (e.g., $gfb_0$ and $gfb_1$) from a subcarrier scrambling pattern, to yield corresponding scrambled groups. All random complex numbers are normalized with an amplitude value of 1. The scrambling patterns in the transmitters 704 and 710 could be different and there may not be any specific rule to choose the value of the normalized random complex number. The symbols in each scrambled group may then be forwarded to an inverse fast Fourier transformer (IFFT) (not shown in FIGS. 7A and 7B) in each of the transmitters 704 and 710.

In one embodiment, the symbol scrambling pattern and the subcarrier scrambling pattern in the transmitter 704 of area-A are $[gta_0, gta_1, \ldots, gta_{M-1}]$ and $[gfa_0, gfa_1, \ldots, gfa_{N-1}]$, respectively, and the symbol scrambling pattern and the subcarrier scrambling pattern in the transmitter 710 of area-B are $[gtb_0, gtb_1, \ldots, gtb_{M-1}]$ and $[gfb_0, gfb_1, \ldots, gfb_{N-1}]$, respectively, where M is the total number of symbol groups and N is the total number of subcarrier groups in each of the transmitters 704 and 710. The scrambling patterns in the transmitters 704 and 710 are random complex numbers with an amplitude value of 1. OFDM symbols in the same group are scrambled by the same scrambling number. The channel response of the signals received from the transmitters 704 and 710 in the SFN are:

$$h[0,0]=gta_0*gfa_0*h_a+gtb_0*gfb_0*h_b,$$

$$h[0,1]=gta_0*gfa_1*h_a+gtb_0*gfb_1*h_b,$$

.

.

.

$$h[0,N-1]=gta_0*gfa_{N-1}*h_a+gtb_0*gfb_{N-1}*h_b,$$

.

.

.

$$h[M-1,0]=gta_{M-1}*gfa_0*h_a+gtb_{M-1}*gfb_0*h_b,$$

$$h[M-1,1]=gta_{M-1}*gfa_1*h_a+gtb_{M-1}*gfb_1*h_b,$$

.

.

.

$$h[M-1,N-1]=gta_{M-1}*gfa_{N-1}*h_a+gtb_{M-1}*gfb_{N-1}*h_b.$$

For example, if the total number of symbol groups M in each of the transmitters 704 and 710 is 2 and the total number of subcarrier groups N in each of the transmitters 704 and 710 is also 2, the symbol scrambling pattern and the subcarrier scrambling pattern in the transmitter 704 of area-A may then be $[gta_0, gta_1]$ and $[gfa_0, gfa_1]$, respectively, and the symbol scrambling pattern and the subcarrier scrambling pattern in the transmitter 710 of area-B may then be $[gtb_0, gtb_1]$ and $[gfb_0, gfb_1]$, respectively. The channel responses of the signals received from the transmitters 704 and 710 in the SFN may be:

$$r_1=h[0,0]=ga_1*h_a+gb_1*h_b,$$

$$r_2=h[0,1]=ga_2*h_a+gb_2*h_b,$$

$$r_3=h[1,0]=ga_3*h_a+gb_3*h_b,$$

$$r_4=h[1,1]=ga_4*h_a+gb_4*h_b,$$

where, $$ga_1=gta_0*gfa_0,$$

$$ga_2=gta_0*gfa_1,$$

$$ga_3=gta_1*gfa_0,$$

$$ga_4=gta_1*gfa_1,$$

$$gb_1=gtb_0*gfb_0,$$

$$gb_2=gtb_0*gfb_1,$$

$$gb_3=gtb_1*gfb_0,$$

$$gb_4=gtb_1*gfb_1.$$

Figure 7C:
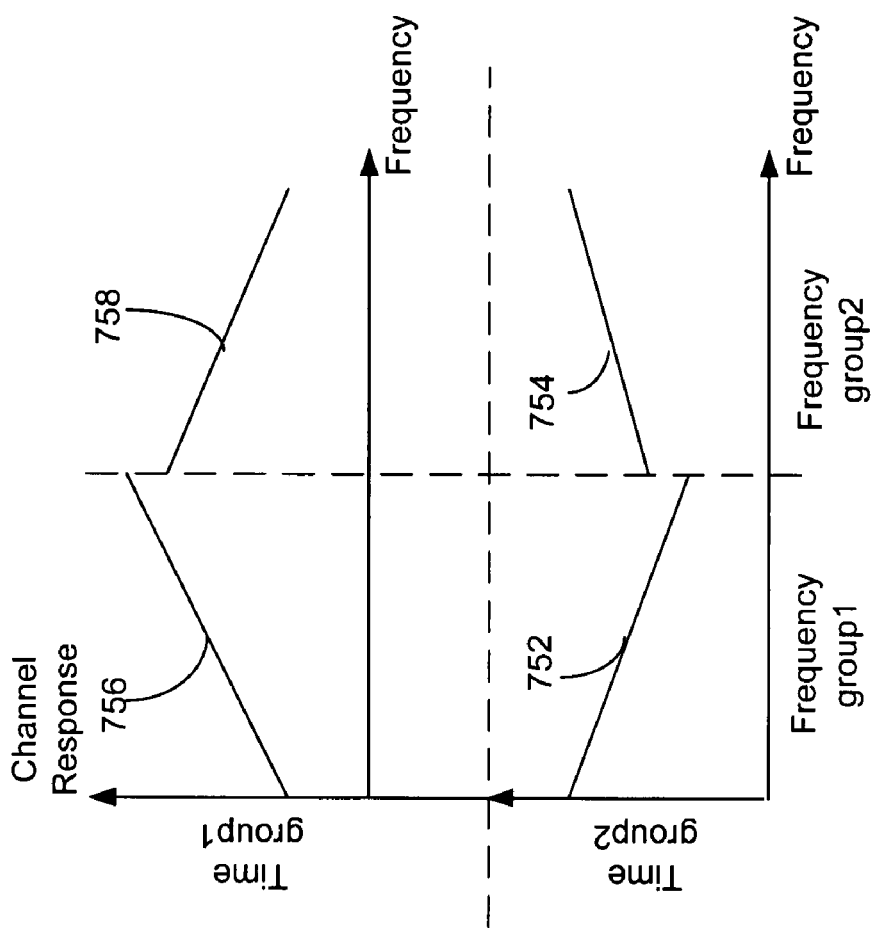
FIG. 7C illustrates channel response for each grid group in a received signal according to an exemplary embodiment.

As shown in FIG. 7C, channel response 752, 754, 756, and 758 for group1 742, group2 744, group3 746, and group4 748 in the received signal 716, respectively, is of low correlation and hence a time and frequency diversity effect is obtained.

Figure 8:
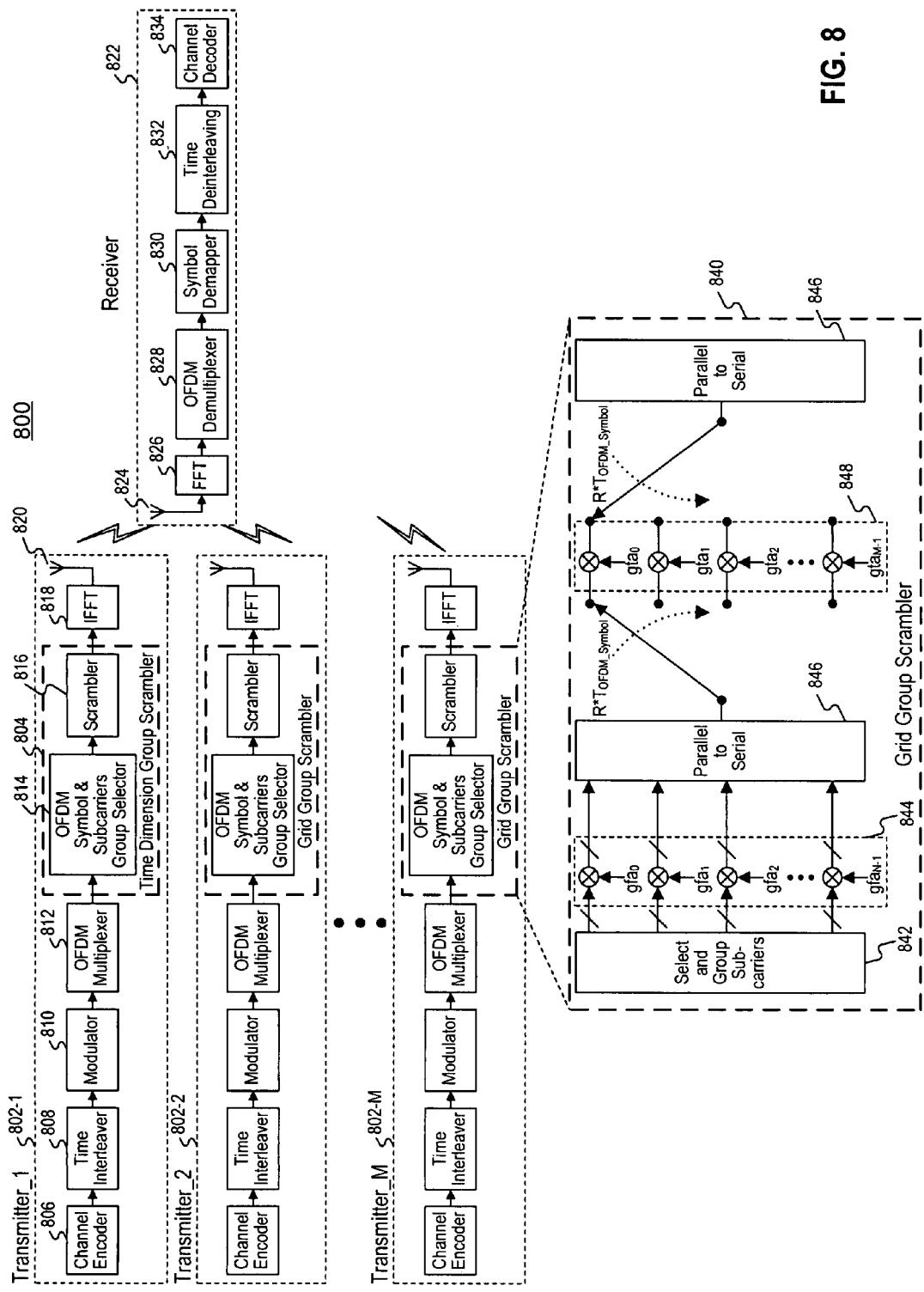
FIG. 8 illustrates an OFDM wireless communication system to which a grid group scrambling method is applied according to an exemplary embodiment.

FIG. 8 is a block diagram illustrating an OFDM wireless communication system 800 to which a grid group scrambling method is applied according to an exemplary embodiment.

The same data are transmitted from M different transmitters 802-1, 802-2, ..., 802-M in an SFN. In each transmitter 802-1, 802-2, ..., 802-M, a signal of OFDM symbols is transmitted to a grid group scrambler 804 through a channel encoder 806, a time interleaver 808, a modulator 810, and an OFDM multiplexer 812. The channel encoder 806 and the time interleaver 808 provide means for not only preventing consecutive errors but also correcting error bits according to correctly decoded data bits on the receiver side. The grid group scrambler 804 includes an OFDM symbol and subcarrier group selector 814 for grouping symbols and a scrambler 816 for scrambling the symbols by multiplying each group with a normalized random complex number. An IFFT 818 converts the scrambled signal from frequency-domain to time-domain and the time-domain signal is then transmitted by an antenna 820. On the receiver side, a receiver 822 includes an antenna 824 that receives the time-domain signal followed by a fast Fourier transformer (FFT) 826 which converts the time-domain signal to a frequency-domain signal. The frequency-domain signal then passes through an OFDM demultiplexer 828, a symbol demapper 830, a time deinterleaver 832, and a channel decoder 834 to recover the transmitted data.

In an embodiment, as shown in block 840, the grid group scrambler 804 can be implemented with a subcarrier group selector 842, a subcarrier group scrambler 844, an OFDM symbol group selector 846, and an OFDM symbol group scrambler 848. The subcarrier scrambling pattern [$gfa_0$, $gfa_1, \ldots, gfa_{N-1}$] is scrambled by the subcarrier group scrambler 844 after the subcarrier group selector 842 selects and groups subcarriers. The OFDM symbol group selector 846 is configured to switch to different normalized random complex numbers in the symbol scrambling pattern [$gta_0$, $gta_1$, $gta_{M-1}$] for scrambling different OFDM symbol groups by the OFDM symbol group scrambler 848.

Figure 9:
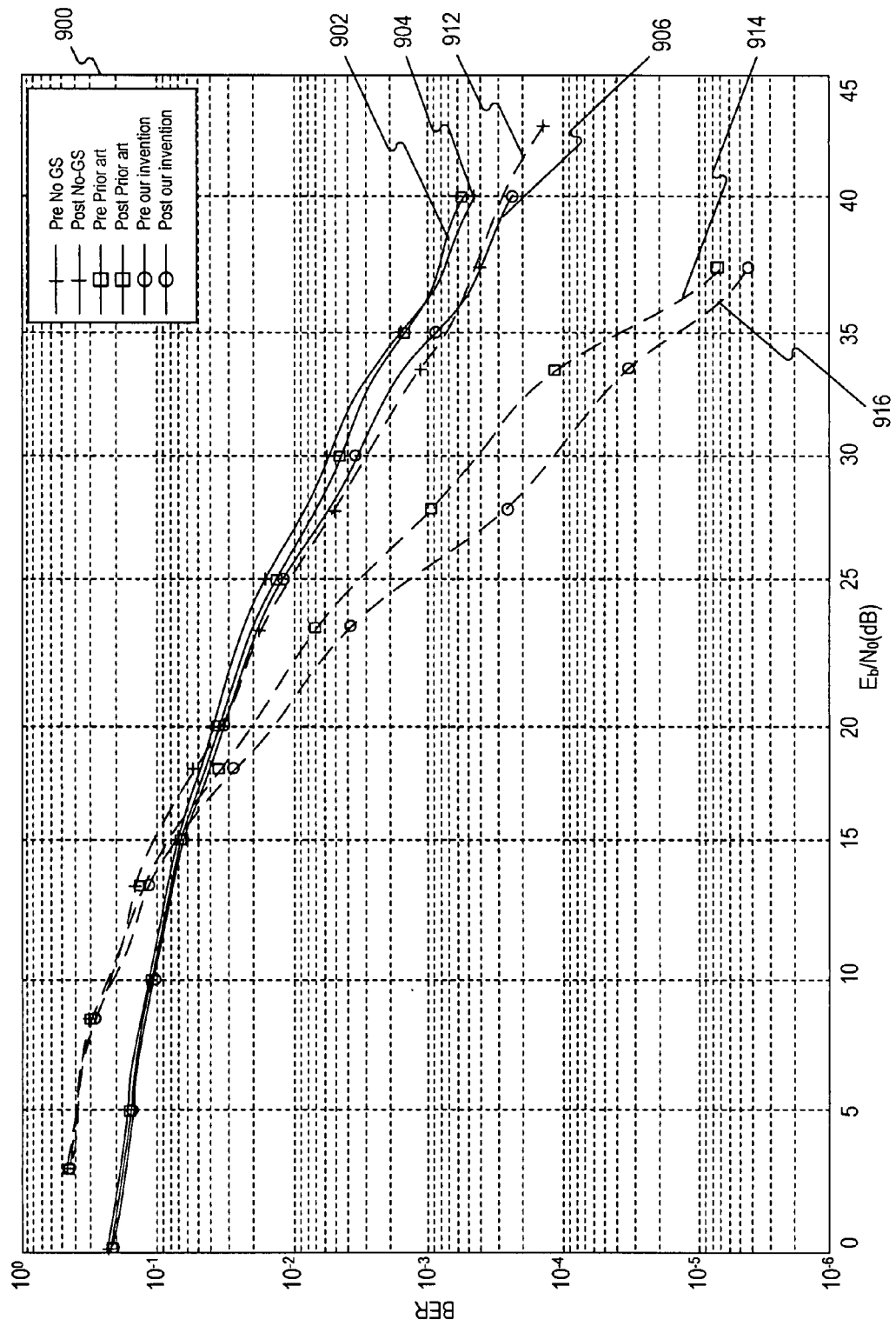
FIG. 9 illustrates simulation results of the time-dimension group scrambling and grid group scrambling techniques in accordance with exemplary embodiments.

FIG. 9 illustrates simulation results 900 of the time-dimension group scrambling and grid group scrambling techniques in accordance with exemplary embodiments. A small delay spread channel model with two paths was used to simulate the performance. The simulation results 900 show a bit error rate (BER) 902 of the OFDM technique without group scrambling techniques incorporated, a BER 904 of a technique in the related art, and a BER 906 of the grid group scrambling technique before signals enter the decoder on the receiver side. For comparison, the simulation results 900 also show a BER 912 of the OFDM technique without group scrambling techniques incorporated, a BER 914 of the technique in the related art, and a BER 916 of the grid group scrambling technique after signals pass through the decoder on the receiver side. The simulation results 900 demonstrate that the BER 916 of the grid group scrambling technique is better than both the BER 912 of the OFDM technique without group scrambling techniques incorporated and the BER 914 of the technique in the related art. The time-dimension group scrambling technique has a similar BER performance to the related art, but it can provide more correct channel state information with lower implementation complexity.

Figure 10:
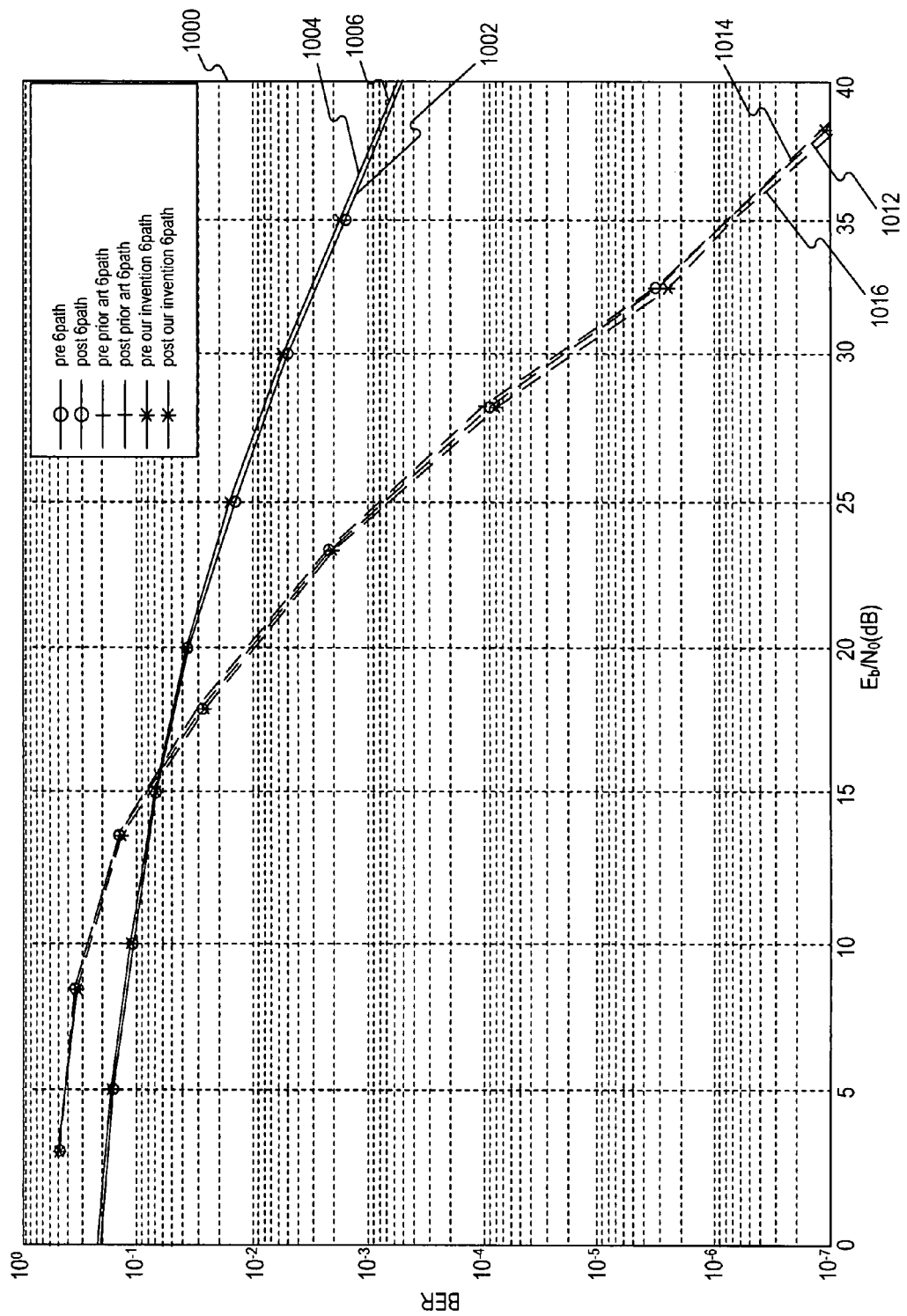
FIG. 10 illustrates simulation results of the time-dimension group scrambling and grid group scrambling techniques for robust design in general channel response when a receiver is not at coverage boundaries of transmitters.

FIG. 10 illustrates simulation results 1000 of the time-dimension group scrambling and grid group scrambling techniques for robust design in general channel response when a receiver is not at coverage boundaries of transmitters. A general TU-6 channel model was used to simulate the performance. The simulation results 1000 show a bit error rate (BER) 1002 of the OFDM technique without group scrambling techniques incorporated, a BER 1004 of the technique in the related art, and a BER 1006 of the grid group scrambling technique before signals enter the decoder on the receiver side. For comparison, the simulation results 1000 also show a BER 1012 of the OFDM technique without group scrambling techniques incorporated, a BER 1014 of the technique in the related art, and a BER 1016 of the grid group scrambling technique after signals pass through the decoder on the receiver side. The simulation results 1000 demonstrate that the BER performance 1006 of the grid group scrambling technique and the BER performance 1004 of the technique in the related art are comparable, and the grid group scrambling technique does not degrade the OFDM system performance.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art to which this invention and all within the limits of the appended claims. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for transmitting signals using orthogonal frequency division multiplexing (OFDM) symbols in a wireless communication system, the method comprising:
   determining a number of OFDM symbols to be included in each of a plurality of symbol groups to be generated;
   selecting a plurality of adjacent OFDM symbols to generate the symbol groups in a time dimension, each of the symbol groups including adjacent OFDM symbols;
   independently and randomly selecting a scrambling pattern;
   multiplying the scrambling pattern with the symbol groups by switching, by an OFDM symbol group selector, to different numbers in the scrambling pattern to scramble different symbol groups; and
   transmitting the signals.

2. The method of claim 1, wherein the transmitting comprises transmitting the signals in a single-frequency network.

3. The method of claim 1, further comprising:
   channel encoding the signals to be transmitted; and
   generating the plurality of OFDM symbols after the channel encoding.

4. The method of claim 1, further comprising:
   time interleaving the signals to be transmitted; and
   generating the plurality of OFDM symbols after the time interleaving.

5. The method of claim 1, wherein the scrambling pattern comprises a normalized random complex number with an amplitude of 1.

6. An apparatus for processing signals to be transmitted using orthogonal frequency division multiplexing (OFDM) symbols in a wireless communication system, the apparatus comprising:
   an OFDM symbol group selector for determining a number of OFDM symbols to be included in each of a plurality of symbol groups to be generated, and for selecting a plurality of adjacent OFDM symbols to generate the symbol groups in a time dimension, each of the symbol groups including adjacent OFDM symbols; and a scrambler for independently and randomly selecting a scrambling pattern and for multiplying the scrambling pattern with the symbol groups, wherein the OFDM symbol group selector switches to different numbers in the scrambling pattern for the scrambler to scramble different symbol groups.

7. The apparatus of claim 6, wherein the apparatus is configured for implementing in a single-frequency network.

8. The apparatus of claim 6, further comprising a channel encoder for encoding signals to be transmitted;

wherein the OFDM symbol group selector selects the plurality of OFDM symbols after the channel encoder encodes the signals to be transmitted.

9. The apparatus of claim 8, further comprising a time interleaver for interleaving the encoded signals to be transmitted;

wherein the OFDM symbol group selector selects the plurality of OFDM symbols after the time interleaver interleaves the encoded signals to be transmitted.

10. The apparatus of claim 6, wherein the scrambling pattern comprises a normalized random complex number with an amplitude of 1.

11. A method for transmitting signals using orthogonal frequency division multiplexing (OFDM) symbols in a wireless communication system, the method comprising:

determining a number of subcarriers and a number of OFDM symbols to be included in each of a plurality of grid groups to be generated;

selecting a plurality of subcarriers in a frequency dimension and a plurality of adjacent OFDM symbols in a time dimension to generate the grid groups, each of the grid groups including adjacent subcarriers and adjacent OFDM symbols;

independently and randomly selecting a scrambling pattern;

multiplying the scrambling pattern with the grid groups by switching, by an OFDM symbol and subcarrier group selector, to different numbers in the scrambling pattern to scramble different grid groups; and transmitting the signals.

12. The method of claim 11, further comprising transmitting the signals in a single-frequency network.

13. The method of claim 11, further comprising:
channel encoding the signals to be transmitted; and
generating the plurality of OFDM symbols after the channel encoding.

14. The method of claim 11, further comprising:
time interleaving the signals to be transmitted; and
generating the plurality of OFDM symbols after the time interleaving.

15. The method of claim 11, wherein the scrambling pattern comprises a normalized random complex number with an amplitude of 1.

16. An apparatus for processing signals to be transmitted using orthogonal frequency division multiplexing (OFDM) symbols in a wireless communication system, the apparatus comprising:

an OFDM symbol and subcarrier group selector for determining a number of subcarriers and a number of OFDM symbols to be included in each of a plurality of grid groups to be generated, and for selecting a plurality of subcarriers in a frequency dimension and a plurality of adjacent OFDM symbols in a time dimension to generate the grid groups, each of the grid groups including adjacent subcarriers and adjacent OFDM symbols; and a scrambler for independently and randomly selecting a scrambling pattern, and for multiplying the scrambling pattern with the grid groups, wherein the OFDM symbol and subcarrier group selector switches to different numbers in the scrambling pattern for the scrambler to scramble different grid groups.

17. The apparatus of claim 16, wherein the apparatus is configured for implementing in a single-frequency network.

18. The apparatus of claim 16, further comprising a channel encoder for encoding signals to be transmitted;

wherein the OFDM symbol and subcarrier group selector selects the plurality of subcarriers in the frequency dimension and the plurality of OFDM symbols in the time dimension after the channel encoder encodes the signals to be transmitted.

19. The apparatus of claim 18, further comprising a time interleaver for interleaving the encoded signals to be transmitted;

wherein the OFDM symbol and subcarrier group selector selects the plurality of subcarriers in the frequency dimension and the plurality of OFDM symbols in the time dimension after the time interleaver interleaves the encoded signals to be transmitted.

20. The apparatus of claim 16, wherein the scrambling pattern comprises a normalized random complex number with an amplitude of 1.

* * * * *